United States Patent
Cheng et al.

(10) Patent No.: US 9,041,374 B2
(45) Date of Patent: May 26, 2015

(54) POWER CONVERTING CIRCUIT AND CONTROL CIRCUIT THEREOF

(71) Applicant: Richtek Technology Corporation, Chupei, Hsinchu (TW)

(72) Inventors: Hung-Yu Cheng, Taipei (TW); Chung-Lung Pai, Hsinchu (TW); Tzu Huan Chiu, Taichung (TW); Chien-Ping Lu, Tainan (TW)

(73) Assignee: RICHTEK TECHNOLOGY CORPORATION, Chupei (TW)

( * ) Notice: Subject to any disclaimer, the term of this patent is extended or adjusted under 35 U.S.C. 154(b) by 0 days.

(21) Appl. No.: 14/206,877

(22) Filed: Mar. 12, 2014

(65) Prior Publication Data

US 2014/0266133 A1    Sep. 18, 2014

(30) Foreign Application Priority Data

Mar. 14, 2013   (TW) .............................. 102109129 A (51) Int. Cl.
*H02M 3/156* (2006.01)
*H02M 3/158* (2006.01)
*H02M 1/00* (2006.01)

(52) U.S. Cl.
CPC ............... *H02M 3/156* (2013.01); *Y02B 70/16* (2013.01); *H02M 3/1588* (2013.01); *H02M 2001/0032* (2013.01)

(58) Field of Classification Search
CPC ..................... H02M 3/156; H02M 2001/0032; H02M 3/1588; Y02B 70/16
USPC .................................................. 323/282, 283
See application file for complete search history.

(56) References Cited

U.S. PATENT DOCUMENTS

| 6,566,916 | B1 * | 5/2003 | Morimoto et al. | ............... 327/77 |
| 6,917,227 | B1 * | 7/2005 | Ochi | ............................. 327/111 |
| 8,089,782 | B2 | 1/2012 | Wei | |

* cited by examiner

*Primary Examiner* — Gary L Laxton
*Assistant Examiner* — Afework Demisse
(74) *Attorney, Agent, or Firm* — Birch, Stewart, Kolasch & Birch, LLP (57) ABSTRACT

A power converting circuit includes an upper gate switch, a transistor, a current source circuit, a comparator circuit, a delay circuit, and a pulse width modulation signal generating circuit. The transistor and the current source circuit provide a reference signal. The comparator circuit generates a comparing signal according to the reference signal and an output signal provided by the upper gate switch. The delay circuit generates a delay signal according to the comparing signal and a clock signal. The pulse width modulation signal generating circuit generates a control signal for the upper gate switch according to the delay signal and the clock signal for configuring the conduction status of the upper gate switch. The power converting circuit adjusts the conduction time of the upper gate switch according to the reference signal and the output signal.

12 Claims, 4 Drawing Sheets

POWER CONVERTING CIRCUIT AND CONTROL CIRCUIT THEREOF

CROSS-REFERENCE TO RELATED APPLICATIONS

This application claims the benefit of priority to Patent Application No. 102109129, filed in Taiwan on Mar. 14, 2013; the entirety of which is incorporated herein by reference for all purposes.

BACKGROUND

The disclosure generally relates to a power converting circuit and, more particularly, to the power converting circuit capable of precisely providing a small output signal.

In view of the concerns on the resource depletion and the environmental protection, many governments and industrial standards require electronic products to consume power more efficiently for reducing the energy consumption.

In electronic products, the power converting circuit is usually utilized to convert the input power signal to appropriate voltage signals and current signals for proving power to other circuit elements. Many control mechanisms therefore focus on adjusting the voltage signals and the current signals according to the load of the power converting circuit for reducing the power consumption of the electronic product. For example, some electronic products comprise multiple operation modes for providing different computation capabilities. For example, the electronic product may consume more power in the normal operation mode and consume less power in the standby operation mode.

Some techniques have proposed configuring the power converting circuit to provide less output current for reducing power consumption when the load of the power converting circuit is small or zero. However, affected by the converting ratio of the power converting circuit, the inductor coupled with the power converting circuit and the manufacture process variation, the power converting circuit has difficulty providing a small output signal precisely.

SUMMARY

In view of the foregoing, it may be appreciated that a substantial need exists for methods and apparatuses that mitigate or reduce the problems above.

An example embodiment of a power converting circuit is disclosed, comprising: an upper gate switch comprising a first terminal, a second terminal and a control terminal, wherein the first terminal of the upper gate switch is configured to operably couple with a first predetermined voltage level and the second terminal of the upper gate switch is configured to operably provide an output signal; a first transistor comprising a first terminal, a second terminal and a control terminal, wherein the first terminal of the first transistor is configured to operably couple with the first predetermined voltage level and the control terminal of the first transistor is configured to operably couple with a second predetermined voltage level; a first power source circuit, coupled with the second terminal of the first transistor and the second predetermined voltage level, configured to operably provide a reference current signal for generating a reference signal at the second terminal of the first transistor; a comparator circuit, coupled with the second terminal of the upper gate switch and the second terminal of the first transistor, configured to operably provide a comparing signal according to the reference signal and the output signal; a delay circuit, coupled with the comparator circuit, configured to operably provide a delay signal according to the comparing signal and a clock signal; and a pulse width modulation signal generating circuit, coupled with the delay circuit, configured to operably provide an upper gate control signal for configuring a conduction status of the upper gate switch; wherein when the upper gate control signal configures the upper gate switch to be not conducted and the output signal is greater than the reference signal, the comparator circuit configures the delay circuit to configure the delay signal for increasing a conduction time of the upper gate switch; and when the upper gate control signal configures the upper gate switch to be not conducted and the output signal is less than the reference signal, the comparator circuit configures the delay circuit to configure the delay signal for decreasing a conduction time of the upper gate switch.

Another example embodiment of a control circuit of a power converting circuit is disclosed, configured to operably couple with a control terminal of an upper gate switch wherein a first terminal of the upper gate switch is configured to operably coupled with a first predetermined voltage level, the second terminal of the upper gate switch is configured to operably provide an output signal, comprising: a first transistor comprising a first terminal, a second terminal and a control terminal, wherein the first terminal of the first transistor is configured to operably couple with the first predetermined voltage level and the control terminal of the first transistor is configured to operably couple with a second predetermined voltage level; a first power source circuit, coupled with the second terminal of the first transistor and the second predetermined voltage level, configured to operably provide a reference current signal for generating a reference signal at the second terminal of the first transistor; a comparator circuit, coupled with the second terminal of the upper gate switch and the second terminal of the first transistor, configured to operably provide a comparing signal according to the reference signal and the output signal; a delay circuit, coupled with the comparator circuit, configured to operably provide a delay signal according to the comparing signal and a clock signal; and a pulse width modulation signal generating circuit, coupled with the delay circuit, configured to operably provide an upper gate control signal for configuring a conduction status of the upper gate switch; wherein when the upper gate control signal configures the upper gate switch to be not conducted and the output signal is greater than the reference signal, the comparator circuit configures the delay circuit to configure the delay signal for increasing a conduction time of the upper gate switch; and when the upper gate control signal configures the upper gate switch to be not conducted and the output signal is less than the reference signal, the comparator circuit configures the delay circuit to configure the delay signal for decreasing a conduction time of the upper gate switch.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
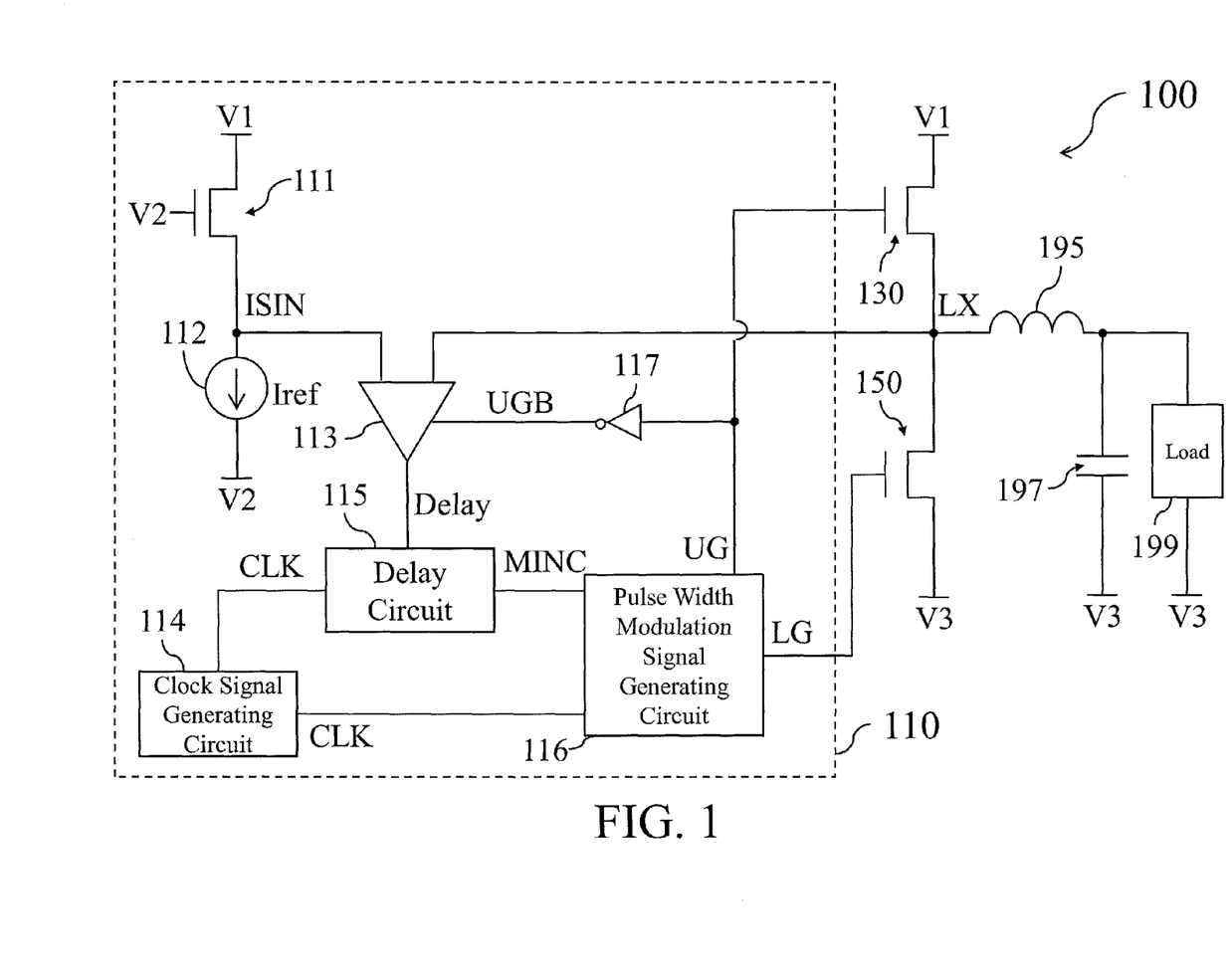
FIG. 1 shows a simplified functional block diagram of a power converting circuit according to one embodiment of the present disclosure.

FIG. 1 shows a simplified functional block diagram of a power converting circuit 100 according to one embodiment of the present disclosure. The power converting circuit 100 comprises a control circuit 110, an upper gate switch 130 and a lower gate switch 150 for providing power to a load 199 through an inductor 195 and a capacitor 197. For the purposes of conciseness and clear explanation, other elements and connections of the power converting circuit 100 is not shown in FIG. 1.

In this embodiment, the upper gate switch 130 and the lower gate switch 150 are respectively realized with a transistor. In other embodiments, the upper gate switch 130 and the lower gate switch 150 may be respectively realized with one or more transistors, e.g., one or more BJTs and FETs.

A first terminal of the upper gate switch 130 is coupled with a first predetermined voltage level V1. A second terminal of the upper gate switch 130 is coupled with the inductor 195. A first terminal of the lower gate switch 150 is coupled with a third predetermined voltage level V3. A second terminal of the lower gate switch 150 is coupled with the inductor 195. The upper gate switch 130 and the lower gate switch 150 are configured to be conducted or not conducted according the control signals UG and LG of the control circuit 110 for providing a output signal LX to a load 199 through the inductor 195 and the capacitor 197.

The control circuit 110 comprises a first transistor 111, a first power source circuit 112, a comparator circuit 113, a clock signal generating circuit 114, a delay circuit 115, a pulse width modulation signal generating circuit 116 and a first inverting circuit 117. The control circuit 110 is configured to operably generate the control signals UG and LG for respectively configuring the conduction statuses of the upper gate switch 130 and the lower gate switch 150.

In this embodiment, a first terminal of the transistor 111 is coupled with the first predetermined voltage level V1, and a control terminal of the transistor 111 is coupled with a second predetermined voltage level V2. The power source circuit 112 is coupled with a second terminal of the transistor 111 and the second predetermined voltage level V2. The power source circuit 112 is configured to operably to generate a reference current signal Iref for generating a reference signal ISIN at the second terminal of the transistor 111.

The comparator circuit 113 is coupled with the second terminal of the upper gate switch 130 and the second terminal of the transistor 111, and coupled with the inverting circuit 117. When an enable signal UGB provided by the inverting circuit 117 is active (e.g., UGB is at high signal level when the active high representation is adopted), the comparator circuit 113 is configured to operably generate a comparing signal Delay according to the reference signal ISIN and the output signal LX. The comparator circuit 113 may generate the comparing signal Delay by utilizing the circuit structure with a suitable gain (e.g., greater than 1, less than 1 or equal to 1) according to different design considerations.

The clock signal generating circuit 114 may be realized with any suitable circuit structure for generating a clock signal CLK. For example, the clock signal generating circuit 114 may generate square wave signals, sinusoidal signals, ramp signals or other suitable periodic signals to be the clock signal CLK.

The delay circuit 115 is coupled with the comparator circuit 113 and the clock signal generating circuit 114 for generating a delay signal MINC according to the comparing signal Delay and the clock signal CLK.

The pulse width modulation signal generating circuit 116 is coupled with the clock signal generating circuit 114 and the delay circuit 115 for generating the upper gate control signal UG and the lower gate control signal LG to respectively configure the conduction statuses of the upper gate switch 130 and the lower gate switch 150 according to the clock signal CLK and the delay signal MINC. For example, the pulse width modulation signal generating circuit 116 may configure the upper gate control signal UG to be active (e.g., UG is at high signal level when the active high representation is adopted) according to the rising edge of the clock signal CLK, and configure the upper gate control signal UG to be inactive (e.g., UG is at low signal level when the active high representation is adopted) according to the falling edge of the delay signal MINC.

The inverting circuit 117 is configured to operably generate the enable signal UGB, which is an inverted signal to the upper gate control signal UG, according to the upper gate control signal UG. For example, when the upper gate control signal UG is at high signal level, the inverting circuit 117 configures the enable signal UGB to be at low signal level. When the upper gate control signal UG is at low signal level, the inverting circuit 117 configures the enable signal UGB to be at high signal level.

In this embodiment, when the upper gate control signal UG provided by the pulse width modulation signal generating circuit 116 configures the upper gate switch 130 to be not conducted and the output signal LX is greater than the reference signal ISIN, the comparator circuit 113 configures the comparing signal Delay to be at high signal level for configuring the delay circuit 115 to configure the delay signal MINC. Thus, the time in which the upper gate control signal UG appears to be active and the conduction time of the upper gate switch 130 may be increased. When the upper gate control signal UG provided by the pulse width modulation signal generating circuit 116 configures the upper gate switch 130 to be not conducted and the output signal LX is less than the reference signal ISIN, the comparator circuit 113 configures the comparing signal Delay to be at low signal level for configuring the delay circuit 115 to configure the delay signal MINC. Thus, the time in which the upper gate control signal UG appears to be active and the conduction time of the upper gate switch 130 may be decreased. When the control circuit 110 configures the reference signal ISIN to be the required value, the control circuit 110 may configure the conduction time of the upper gate switch 130 by configuring the time in which the upper gate control signal UG appears to be active. Thus, the output signal LX may be configured to be the required value.

In the embodiment in FIG. 1, for the purpose of clear explanation, the first terminal of transistor 111 and the first terminal of the upper gate switch 130 are configured to couple with the first predetermined voltage level V1. The second terminal and the control terminal of the transistor 111 are configured to couple with the second predetermined voltage level V2. The first terminal of the lower gate switch 150, the capacitor 197 and the load 199 are configured to couple with the third predetermined voltage level V3. In other embodiments, the above elements may be respectively coupled with the same or different voltage levels according to different design considerations.

Figure 2:
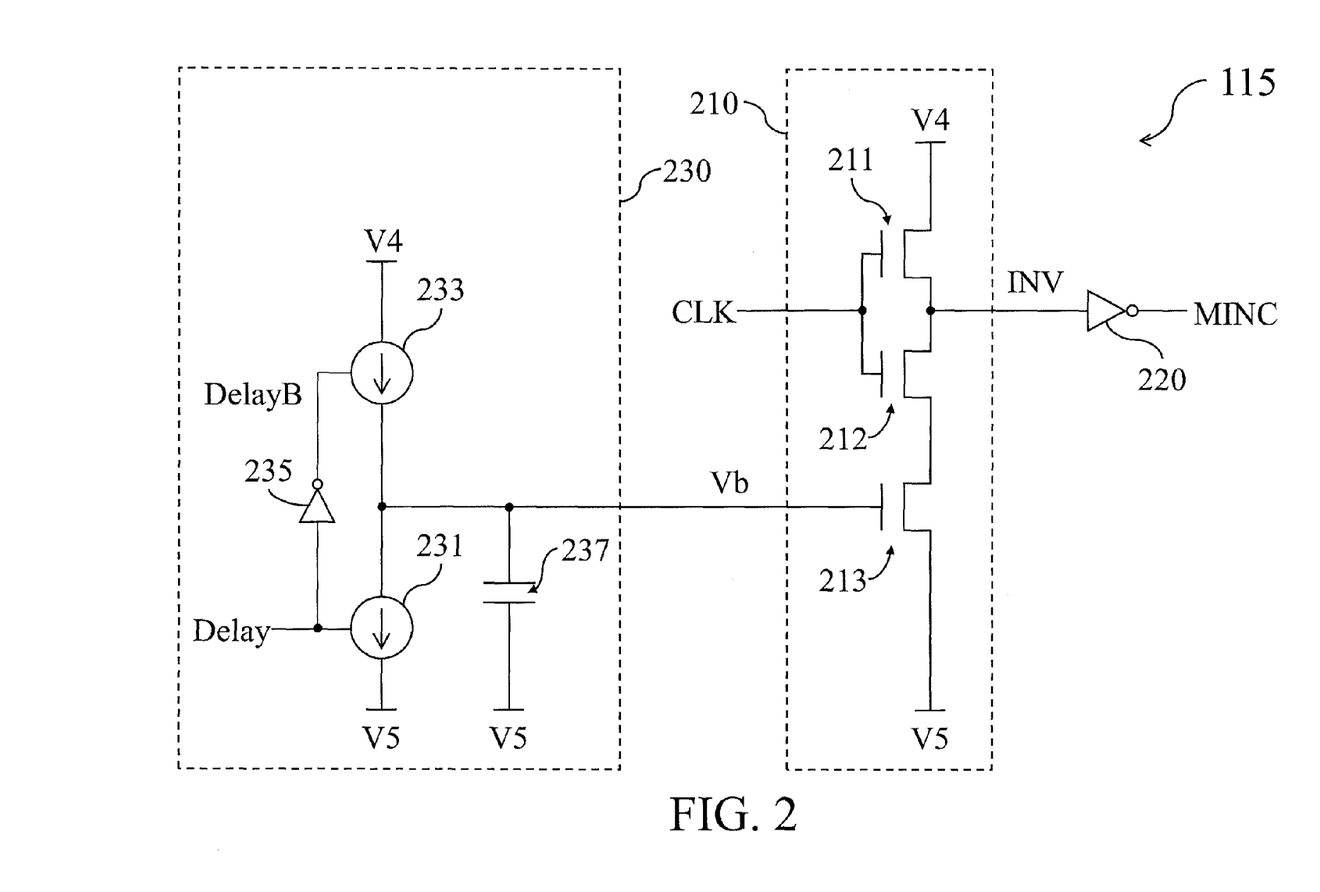
FIG. 2 shows a simplified functional block diagram of the delay circuit in FIG. 1 according to one embodiment of the present disclosure.

FIG. 2 shows a simplified functional block diagram of the delay circuit 115 in FIG. 1 according to one embodiment of the present disclosure. In the embodiment in FIG. 2, the delay circuit 115 comprises a second inverting circuit 210, a third inverting circuit 220 and a voltage adjusting circuit 230 for generating the delay signal MINC according to the clock signal CLK and the comparing signal Delay. For the purposes of conciseness and clear explanation, other elements and connections of the delay circuit 115 is not shown in FIG. 2.

The inverting circuit 210 comprises a first input terminal, a second input terminal and an output terminal. The first terminal of the inverting circuit 210 is configured to operably receive the clock signal CLK. The second terminal of the inverting circuit 210 is configured to operably receive the bias signal Vb for providing an inverted clock signal INV, which is an inverted signal to the clock signal CLK, at the output terminal of the inverting circuit 210.

In the embodiment in FIG. 2, the inverting circuit 210 comprises a second transistor 211, a third transistor 212 and a fourth transistor 213. A control terminal of the transistor 211 is configured to operably receive the clock signal CLK. A first terminal of the transistor 211 is coupled with a fourth predetermined voltage level V4. A second terminal of the transistor 211 is coupled with the inverting circuit 220. A control terminal of the transistor 212 is configured to operably receive the clock signal CLK. A first terminal of the transistor 212 is coupled with the inverting circuit 220. A second terminal of the transistor 212 is coupled with a first terminal of the transistor 213. A control terminal of the transistor 213 is configured to operably receive the bias signal Vb. The first terminal of the transistor 213 is configured to couple with the second terminal of the transistor 212. A second terminal of the transistor 213 is coupled with coupled with a fifth predetermined voltage level V5.

The inverting circuit 220 is coupled with the output terminal of the inverting circuit 210 for generating the delay signal MINC, which is an inverted signal to the inverted clock signal INV, according to the inverted clock signal INV.

In the embodiment in FIG. 2, the voltage adjusting circuit 230 comprises a second power source circuit 231, a third power source circuit 233, a fourth inverting circuit 235 and a capacitor 237 for generating the bias signal Vb according to the comparing signal Delay. The bias signal Vb is transmitted to the second input terminal of the inverting circuit 210.

A first terminal of the power source circuit 231 is coupled with the fifth voltage level V5. A second terminal of the power source circuit 231 is coupled with the capacitor 237 and the second input terminal of the inverting circuit 210. When the comparing signal Delay is active, the power source circuit 231 discharges the capacitor 237 to decrease the bias signal Vb.

A first terminal of the power source circuit 233 is coupled with the fourth voltage level V5. A second terminal of the power source circuit 231 is coupled with the capacitor 237 and the second input terminal of the inverting circuit 210. When the inverted comparing signal DelayB is active, the power source circuit 231 charges the capacitor 237 to increase the bias signal Vb.

The inverting circuit 235 is configured to operably generate the inverted comparing signal DelayB, which is an inverted signal to the comparing signal Delay, according to the comparing signal Delay.

When the clock signal CLK is at high signal level (when expressed in active high representation) and the comparing signal Delay is active, the power source circuit 231 discharges the capacitor 237 to decrease the bias signal Vb. Thus, the time for the inverting circuit 210 to perform the inverting operation is longer and therefore the time in which the delay signal MINC appears to be at high signal level is increased. When the clock signal CLK is at high signal level (when expressed in active high representation) and the comparing signal Delay is inactive, the power source circuit 231 charges the capacitor 237 to increase the bias signal Vb. Thus, the time for the inverting circuit 210 to perform the inverting operation is shorter and therefore the time in which the delay signal MINC appears to be at high signal level is decreased.

Figure 3:
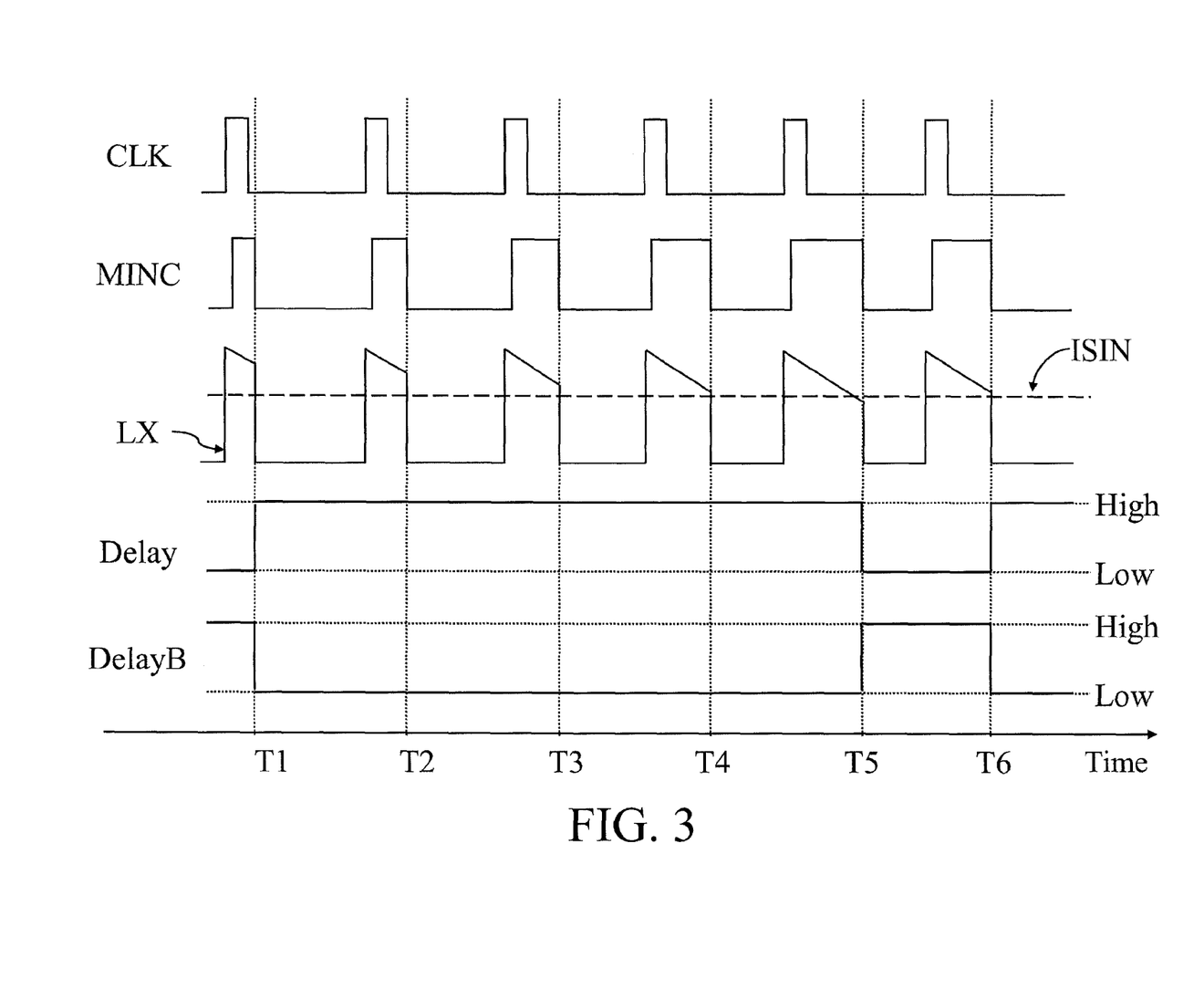
FIG. 3 shows a simplified timing diagram of several signals generated in the power converting circuit in FIG. 1 according to one embodiment of the present disclosure.

FIG. 3 shows a simplified timing diagram of several signals generated in the power converting circuit in FIG. 1 according to one embodiment of the present disclosure. The power converting circuit 100 is further explained below with FIGS. 1-3.

At the time points T1, T2, T3 and T4, the output signal LX is greater than the reference signal ISIN. The comparator circuit 113 configures the comparing signal Delay to be at high signal level. The power source circuit 231 discharges the capacitor 237 to decrease the bias signal Vb. The time in which the delay signal MINC appears to be at high signal level and therefore the conduction time of the upper gate switch 130 may be increased.

At the time point T5, the output signal LX is less than the reference signal ISIN. The comparator circuit 113 configures the comparing signal Delay to be at low signal level. The power source circuit 231 charges the capacitor 237 to increase the bias signal Vb. The time in which the delay signal MINC appears to be at high signal level and therefore the conduction time of the upper gate switch 130 may be decreased.

At the time point T6, the output signal LX is greater than the reference signal ISIN. The comparator circuit 113 configures the comparing signal Delay to be at high signal level. The power source circuit 231 discharges the capacitor 237 to decrease the bias signal Vb. The time in which the delay signal MINC appears to be at high signal level and therefore the conduction time of the upper gate switch 130 may be increased.

Thus, the control circuit 110 may configure the time in which the control signal UG appeared to be at high signal level by configuring the reference signal ISIN. Moreover, even if the power converting circuit 110 needs to provide a small output signal LX, the control circuit 110 may precisely configure the time in which the control signal UG appeared to be at high signal level and therefore the conduction time of the upper gate switch 130 so as to precisely provide a small output signal LX.

Figure 4:
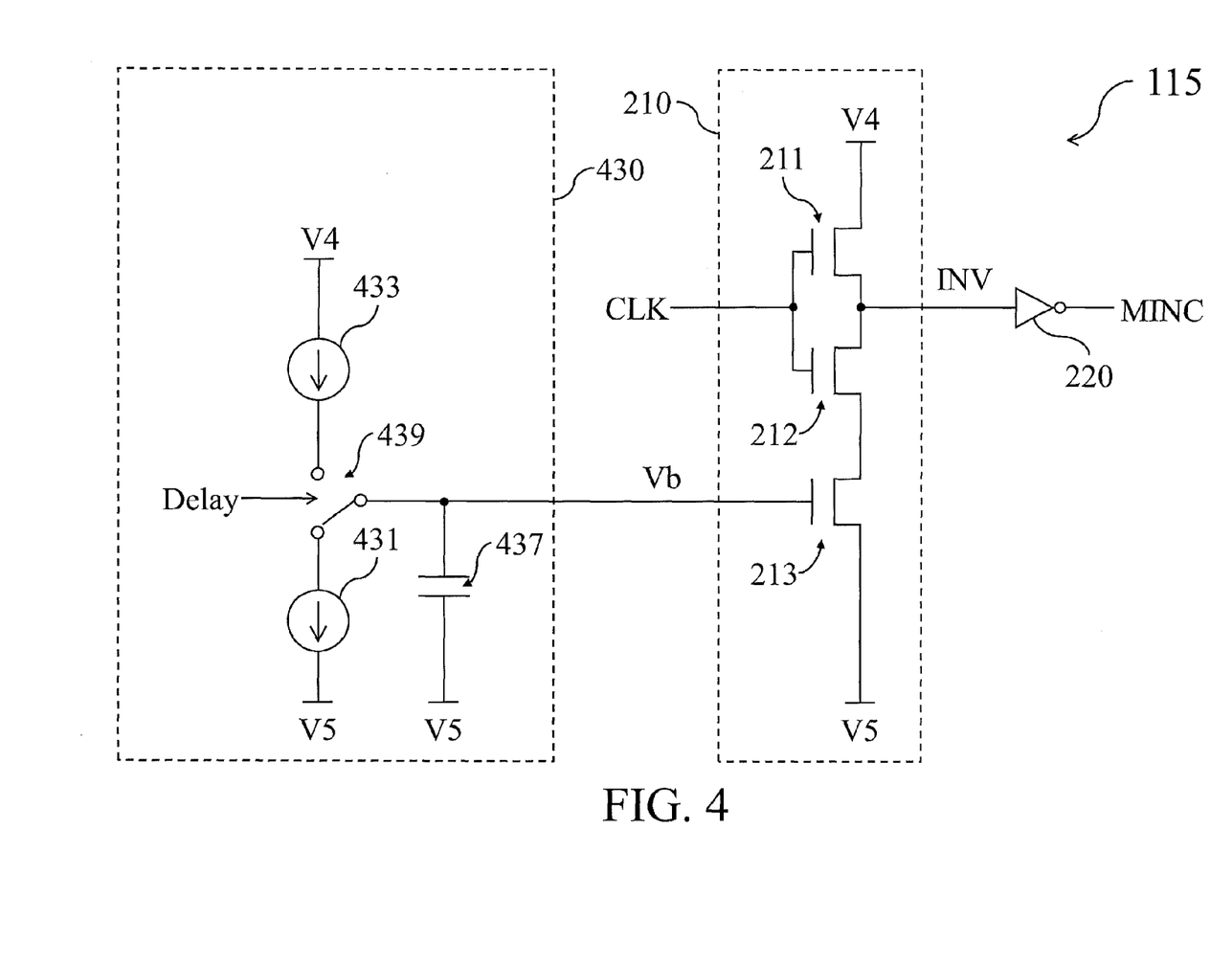
FIG. 4 shows a simplified functional block diagram of the delay circuit in FIG. 1 according to another embodiment of the present disclosure.

In the above embodiment, the functional blocks may be suitably modified according to different design considerations. For example, FIG. 4 shows a simplified functional block diagram of the delay circuit 115 in FIG. 1 according to another embodiment of the present disclosure. In the embodiment in FIG. 4, the delay circuit 115 comprises the second inverting circuit 210, the third inverting circuit 220 and a voltage adjusting circuit 430 for generating the delay signal MINC according to the clock signal CLK and the comparing signal Delay. For the purposes of conciseness and clear explanation, other elements and connections of the delay circuit 115 is not shown in FIG. 4.

The embodiment in FIG. 4 is similar to the embodiment in FIG. 2 and one of the differences is the voltage adjusting circuits 230 and 430. In the embodiment in FIG. 4, the voltage adjusting circuit 430 comprises a fourth power source circuit 431, a fifth power source circuit 433, a capacitor 437 and a switch circuit 439 for generating the bias signal Vb at the second input terminal of the inverting circuit 210 according to the comparing signal Delay.

A first terminal of the power source circuit 431 is coupled with the fifth predetermined voltage level. A second terminal of the power source circuit 431 is coupled with the capacitor 437 through the switch circuit 439. A first terminal of the power source circuit 433 is coupled with the fourth predetermined voltage level. A second terminal of the power source circuit 433 is coupled with the capacitor 437 through the switch circuit 439. When the comparing signal Delay is active, the switch circuit 439 configures the power source circuit 431 to be coupled with the capacitor 437. The power source 431 discharges the capacitor 437 for decreasing the bias signal Vb. When the comparing signal Delay is inactive, the switch circuit 439 configures the power source circuit 433 to be coupled with the capacitor 437. The power source 433 charges the capacitor 437 for increasing the bias signal Vb.

Thus, when the clock signal CLK is at high signal level (when expressed in active high representation) and the comparing signal Delay is active, the power source circuit 431 discharges the capacitor 437 to decrease the bias signal Vb for increasing the time in which the delay signal MINC appears to be at high signal level. When the clock signal CLK is at high signal level (when expressed in active high representation) and the comparing signal Delay is inactive, the power source circuit 431 charges the capacitor 437 to increase the bias signal Vb for decreasing the time in which the delay signal MINC appears to be at high signal level.

In the above embodiments, each functional block may be respectively realized with one or more circuit elements and multiple functional blocks may be realized in a circuit element. For example, when the control circuit is realized with an integrated circuit package, the clock signal generating circuit 114, the upper gate switch and the lower gate switch may be respectively configured in the interior and/or the exterior of the integrated circuit package.

In the above embodiments, the signals and the functional blocks are explained with the active high representation for clear explanation. In other embodiments, the signals and the functional blocks may be respectively realized with the active high representation and the active low representation.

In the above embodiments, the power converting circuit 100 may configure the conduction time of the upper gate switch 130 so as to precisely generate the require output signal LX. Moreover, the power converting circuit 100 may precisely provide a small output signal LX without the influences of the converting ratio of the power converting circuit, the inductor coupled with the power converting circuit and the manufacture process deviation, etc.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

The term "voltage signal" used throughout the description and the claims may be expressed in the format of a current in implementations, and the term "current signal" used throughout the description and the claims may be expressed in the format of a voltage in implementations.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A power converting circuit, comprising:
    an upper gate switch comprising a first terminal, a second terminal and a control terminal, wherein the first terminal of the upper gate switch is configured to operably couple with a first predetermined voltage level and the second terminal of the upper gate switch is configured to operably provide an output signal;
    a first transistor comprising a first terminal, a second terminal and a control terminal, wherein the first terminal of the first transistor is configured to operably couple with the first predetermined voltage level and the control terminal of the first transistor is configured to operably couple with a second predetermined voltage level;
    a first power source circuit, coupled with the second terminal of the first transistor and the second predetermined voltage level, configured to operably provide a reference current signal for generating a reference signal at the second terminal of the first transistor;
    a comparator circuit, coupled with the second terminal of the upper gate switch and the second terminal of the first transistor, configured to operably provide a comparing signal according to the reference signal and the output signal;
    a delay circuit, coupled with the comparator circuit, configured to operably provide a delay signal according to the comparing signal and a clock signal; and
    a pulse width modulation signal generating circuit, coupled with the delay circuit, configured to operably provide an upper gate control signal for configuring a conduction status of the upper gate switch;
    wherein when the upper gate control signal configures the upper gate switch to be not conducted and the output signal is greater than the reference signal, the comparator circuit configures the delay circuit to configure the delay signal for increasing a conduction time of the upper gate switch; and when the upper gate control signal configures the upper gate switch to be not conducted and the output signal is less than the reference signal, the comparator circuit configures the delay circuit to configure the delay signal for decreasing a conduction time of the upper gate switch.

2. The power converting circuit of claim 1, wherein the delay circuit further comprising:

a voltage adjusting circuit configured to operably provide a bias signal according to the comparing signal;

a second inverting circuit comprising a first input terminal, a second input terminal and an output terminal, wherein the first input terminal of the voltage adjusting circuit is configured to operably receive the clock signal, the second input terminal of the adjusting circuit is configured to operably receive the bias signal for providing an inverted clock signal;

a third inverting circuit, coupled with the output terminal of the second inverting circuit, configured to operably provide the delay signal according to the inverted clock signal;

wherein when the comparing signal is active, the voltage adjusting circuit decreases the bias signal to increase the conduction time of the upper gate switch; and when the comparing signal is inactive, the voltage adjusting circuit increases the bias signal to decrease the conduction time of the upper gate switch.

3. The power converting circuit of claim 2, wherein the voltage adjusting circuit further comprising:

a second power source circuit, coupled with the second input terminal of the second inverting circuit, configured to operably discharge a capacitor for decreasing the bias signal to increase the conduction time of the upper gate switch when the comparing signal is active; and a third power source circuit, coupled with the second input terminal of the second inverting circuit, configured to operably charge the capacitor for increasing the bias signal to decrease the conduction time of the upper gate switch when the comparing signal is active.

4. The power converting circuit of claim 3, wherein the voltage adjusting circuit further comprising:

a fourth inverting circuit configured to operably generate an inverted comparing signal according to the comparing signal;

wherein the second power source circuit discharges the capacitor for decreasing the bias signal according to the comparing signal; and the third power source circuit charges the capacitor for increasing the bias signal according to the inverted comparing signal.

5. The power converting circuit of claim 4, wherein the voltage adjusting circuit further comprising:

a switch circuit coupled with the second input terminal of the second inverting circuit, the second power source circuit and the third power source circuit;

wherein when the comparing signal is active, the switch circuit configures the second power source circuit to be coupled with the second input terminal of the second inverting circuit for discharging the capacitor to decrease the bias signal; and when the comparing signal is inactive, the switch circuit configures the third power source circuit to be coupled with the second input terminal of the second inverting circuit for charging the capacitor to increase the bias signal.

6. The power converting circuit of claim 2, wherein the second inverting circuit further comprising:

a second transistor comprising a first terminal, a second terminal and a control terminal, where in the control terminal of the second transistor is configured to operably receive the clock signal, the first terminal of the second transistor is configured to operably coupled with a fourth predetermined voltage level, and the second terminal of the second transistor is configured to operably coupled with the third inverting circuit;

a third transistor comprising a first terminal, a second terminal and a control terminal, where in the control terminal of the third transistor is configured to operably receive the clock signal, and the first terminal of the third transistor is configured to operably coupled with the third inverting circuit; and a fourth transistor comprising a first terminal, a second terminal and a control terminal, where in the control terminal of the fourth transistor is configured to operably receive the bias signal, the first terminal of the transistor is configured to operably coupled with the second terminal of the third transistor, and the second terminal of the transistor is configured to operably coupled with a fifth predetermined voltage level.

7. A control circuit of a power converting circuit, configured to operably couple with a control terminal of an upper gate switch wherein a first terminal of the upper gate switch is configured to operably coupled with a first predetermined voltage level, the second terminal of the upper gate switch is configured to operably provide an output signal, comprising:

a first transistor comprising a first terminal, a second terminal and a control terminal, wherein the first terminal of the first transistor is configured to operably couple with the first predetermined voltage level and the control terminal of the first transistor is configured to operably couple with a second predetermined voltage level;

a first power source circuit, coupled with the second terminal of the first transistor and the second predetermined voltage level, configured to operably provide a reference current signal for generating a reference signal at the second terminal of the first transistor;

a comparator circuit, coupled with the second terminal of the upper gate switch and the second terminal of the first transistor, configured to operably provide a comparing signal according to the reference signal and the output signal;

a delay circuit, coupled with the comparator circuit, configured to operably provide a delay signal according to the comparing signal and a clock signal; and a pulse width modulation signal generating circuit, coupled with the delay circuit, configured to operably provide an upper gate control signal for configuring a conduction status of the upper gate switch;

wherein when the upper gate control signal configures the upper gate switch to be not conducted and the output signal is greater than the reference signal, the comparator circuit configures the delay circuit to configure the delay signal for increasing a conduction time of the upper gate switch; and when the upper gate control signal configures the upper gate switch to be not conducted and the output signal is less than the reference signal, the comparator circuit configures the delay circuit to configure the delay signal for decreasing a conduction time of the upper gate switch.

8. The control circuit of claim 7, wherein the delay circuit further comprising:

a voltage adjusting circuit configured to operably provide a bias signal according to the comparing signal;

a second inverting circuit comprising a first input terminal, a second input terminal and an output terminal, wherein the first input terminal of the voltage adjusting circuit is configured to operably receive the clock signal, the second input terminal of the adjusting circuit is configured to operably receive the bias signal for providing an inverted clock signal;

a third inverting circuit, coupled with the output terminal of the second inverting circuit, configured to operably provide the delay signal according to the inverted clock signal;

wherein when the comparing signal is active, the voltage adjusting circuit decreases the bias signal to increase the conduction time of the upper gate switch; and when the comparing signal is inactive, the voltage adjusting circuit increases the bias signal to decrease the conduction time of the upper gate switch.

9. The control circuit of claim 8, wherein the voltage adjusting circuit further comprising:

a second power source circuit, coupled with the second input terminal of the second inverting circuit, configured to operably discharge a capacitor for decreasing the bias signal to increase the conduction time of the upper gate switch when the comparing signal is active; and a third power source circuit, coupled with the second input terminal of the second inverting circuit, configured to operably charge the capacitor for increasing the bias signal to decrease the conduction time of the upper gate switch when the comparing signal is active.

10. The control circuit of claim 9, wherein the voltage adjusting circuit further comprising:

a fourth inverting circuit configured to operably generate an inverted comparing signal according to the comparing signal;

wherein the second power source circuit discharges the capacitor for decreasing the bias signal according to the comparing signal; and the third power source circuit charges the capacitor for increasing the bias signal according to the inverted comparing signal.

11. The control circuit of claim 10, wherein the voltage adjusting circuit further comprising:

a switch circuit coupled with the second input terminal of the second inverting circuit, the second power source circuit and the third power source circuit;

wherein when the comparing signal is active, the switch circuit configures the second power source circuit to be coupled with the second input terminal of the second inverting circuit for discharging the capacitor to decrease the bias signal; and when the comparing signal is inactive, the switch circuit configures the third power source circuit to be coupled with the second input terminal of the second inverting circuit for charging the capacitor to increase the bias signal.

12. The control circuit of claim 8, wherein the second inverting circuit further comprising:

a second transistor comprising a first terminal, a second terminal and a control terminal, where in the control terminal of the second transistor is configured to operably receive the clock signal, the first terminal of the second transistor is configured to operably coupled with a fourth predetermined voltage level, and the second terminal of the second transistor is configured to operably coupled with the third inverting circuit;

a third transistor comprising a first terminal, a second terminal and a control terminal, where in the control terminal of the third transistor is configured to operably receive the clock signal, and the first terminal of the third transistor is configured to operably coupled with the third inverting circuit; and a fourth transistor comprising a first terminal, a second terminal and a control terminal, where in the control terminal of the fourth transistor is configured to operably receive the bias signal, the first terminal of the transistor is configured to operably coupled with the second terminal of the third transistor, and the second terminal of the transistor is configured to operably coupled with a fifth predetermined voltage level.

\* \* \* \* \*